United States Patent [19]

Monzain

[11] 4,109,952
[45] Aug. 29, 1978

[54] PACKAGE LIFTER

[76] Inventor: Michel Monzain, 674 White Plains Rd., Scarsdale, N.Y. 10583

[21] Appl. No.: 767,227

[22] Filed: Feb. 9, 1977

[51] Int. Cl.² .............................................. B66C 1/30
[52] U.S. Cl. ..................................... 294/16; 294/118
[58] Field of Search ................... 294/16, 28, 62, 67 B, 294/67 BC, 87.22, 87.24, 106, 113, 117–119; 224/45 F, 45 P, 50

[56] References Cited

U.S. PATENT DOCUMENTS

| 113,799 | 4/1871 | Rugg | 294/62 |
|---|---|---|---|
| 228,865 | 6/1880 | Case | 294/28 |
| 905,010 | 11/1908 | Simmons | 294/16 |
| 1,037,712 | 9/1912 | Alfvegren | 294/117 |
| 1,918,486 | 7/1933 | Onos | 294/87.24 |
| 2,011,127 | 8/1935 | Tait et al. | 294/119 X |
| 2,442,698 | 6/1948 | Lang | 294/117 |
| 2,652,715 | 9/1953 | Looze | 294/62 X |
| 2,747,917 | 5/1956 | Smith | 294/118 X |
| 3,301,585 | 1/1967 | Johnson | 294/16 |

FOREIGN PATENT DOCUMENTS 302,117  10/1965  Netherlands ........................ 294/67 BC

*Primary Examiner*—Johnny D. Cherry
*Attorney, Agent, or Firm*—Haseltine, Lake & Waters

[57] ABSTRACT

A package or carton lifter includes tongs which have two laterally spaced pairs of jaw levers physically connected intermediately of the first and second ends. A pair of cross-members rigidly connects the lever pairs at points below the lever-pivotal connections for pivotal movements in unison. First and second links pivotably connected to one another join the first ends of the levers of each pair for opening and closing the tongs, and a first handle extends between the connection points of the links. A second handle is substantially coextensive with the first handle and extends between the pivotal connections of the pairs of levers. Each of the cross-members has an inner side, and a gripping member is provided on the inner side of each of the cross-members for grasping a case or the like. A spring is wrapped around one of the pivotal connections and has first and second ends in contact with the jaw levers, respectively, of one of the lever pairs, urging the jaw levers to occupy a first position, where the second ends are closest to one another. The first and second handles may be jointly gripped and pulled towards one another for the jaw levers to occupy a second position, so that the second ends are furthest apart from one another. The gripping members are adapted to grip a case interposed between the jaw levers in the second position, when the first and second handles are released from the joint grip.

2 Claims, 3 Drawing Figures

PACKAGE LIFTER

BACKGROUND OF THE INVENTION

1. Field of the Invention

The field of the present invention relates to a package case or carton lifter.

2. Description of the Prior Art

There is known a hanger (U.S. Pat. No. 2,011,127) which includes a lazy tong structure which has suspension members at one end, and pairs of legs at the other. A bar extends transversely of each of the legs and a plurality of prongs are disposed on each bar. The prongs of one bar project towards the other, and the prongs are provided with means adapted to extend from its bar outwards to prevent the heat engaged by the prongs from forming contact with the bars. There are also known tongs (U.S. Pat. No. 2,442,698) composed of duplex members connected by jaws of ovoidal contact curvature to conform substantially with the shape of ovoidal objects, so that the tongs obtain an effective hold upon, and beneath the objects and avoid accidental dropping of the objects from the tongs while being carried. The pressure of the tongs on the object incident to the gripping thereof is so distributed as to avoid excessive pressure at localized points which might bruise or injure objects carried therebetween. There is additionally known a crucible support (U.S. Pat. No. 2,229,359) which includes a pair of levers; each lever has a depending article engaging end, and an upper end arranged at an angle with respect thereto. The upper ends cross each other in slightly spaced relation, and means are provided for physically supporting the arms intermediate their ends. Means are additionally provided for effecting upward movement of the free ends of the upper arms to effect movement of the lower arms toward each other, a latch mechanism preventing upper movement of the upward-movement effecting means. The latch mechanism includes a pair of elements, one of which is connected to the upward-movement effecting means; the other latch is relatively stationary and has a portion arranged between the arms at the cross point thereof. There is additionally known a lifting device (U.S. Pat. No. 2,051,655) which includes a pair of jaw members; each of the jaw members has an extension arm, a pivot forming fulcrum for the arm, and where the extension arms terminate on the same side of the pivot as the jaw members. A spring is stretched between the arms to normally maintain the jaw members spaced apart in a receptacle receiving position, and manually-actuated means coact with the arms to overcome the spring action to move the jaw means to grip the receptacle. There are further known tongs (U.S. Pat. No. 531,126) which provide a combination of straight lever arms having curved grappling jaws, each jaw being provided with a gripping pin and terminating below the pin.

There is further known an article carrier (U.S. Pat. No. 1,918,486) including a pair of gripping jaws, a pair of spaced toggle members carried by the jaws, a handle member carried by the toggle members, and an article-protecting shield carried by the toggle members and interposed between the article gripping jaws and the handle.

OBJECT OF THE PRESENT INVENTION

None of the aforesaid devices are suitable for lifting a case or carton; it is therefore one of the objects of my present invention to devise tongs which are suitable for lifting and gripping a package, such as a carton or case, and which occupy automatically a collapsed position when not in use, and can be extended to an extended position when operatively gripping a case, or carton.

It is a further object of my invention to provide a lifter for the transport of cases, but which can also be utilized for the handling of all types of packages, particularly packages of a shape having two opposed parallel faces, fitting between the available openings of the tongs of the lifter, and whose weight does not exceed 30 kilograms.

It is a further object of my invention for an operator to grip the handle and the cross piece of the lifter with his hand open, so that the closure of the hand results in the opening of the lifter's levers, permits the latter to grip a carton or the like for transport, and for the lifter's levers to close upon the release of the cross-bar, thus firmly gripping the package.

It is still another object of my invention to manually transport packages over relatively small distances with the aid of the carton lifter, particularly within stores and warehouses, where transport and handling of packages of 20 to 25 kilograms frequently occur. It is still a further object of my invention for the package to be more easily and more conveniently grippable than by normal manual transport, so that the package may be lifted to a very small height, and therefore require very little effort when lifted, the operator thus achieving a comfortable body position during lifting and transport of the package.

It is still another object of my invention for the operator to be able to use only one hand when lifting the package.

SUMMARY OF THE INVENTION

I accordingly provide tongs which include two laterally spaced pairs of jaw levers which are pivotally connected intermediately of their first and second ends, and cross-members rigidly connecting the levers of the pairs at points below the lever-pivotal connections for pivotal movement in unison. First and second links pivotably connected to one another join the first ends of the levers of each pair for opening and closing the tongs, and a first handle extends between the connected links at the link pivotal connection. A second handle is substantially coextensive with the first handle and extends between, and connects the lever-pivotal connections. Each of the cross-members has an inner side and gripping means are provided on the inner side of each of the cross-members for grasping a case or the like. Spring means may be wrapped around the second handle; the spring means are provided with first and second ends in contact with the jaw levers, respectively, of one of the lever pairs for urging the jaw levers to occupy a first position so that the second ends are closest to one another. The first and second handles may be jointly gripped and pulled towards one another for the jaw levers to occupy a second position, so that the second ends are furthest apart from one another. The gripping means are adapted to grip a case interposed between the jaw levers in the second position upon the first and second handles having been released from the joint grip.

Each of the levers is substantially V-shaped, and the gripping means include a plurality of metal teeth disposed on each of the cross-members in the vicinity of the second ends of the levers. A plastic pad which has a serrated surface is disposed on each of the cross-members at a location remote from the second ends.

The first handle is preferably a tube and includes a bolt which may be passed through the tube. The bolt has threaded ends, and first and second nuts may be threaded on the bolt ends, respectively. Each of the links is formed with an opening for the bolt to pass therethrough.

The spring means preferably include two torsion springs, and each of the springs has first and second arms; each of the arms terminates in the first and second ends respectively, and each of the first and second ends is L-shaped.

Each of the torsion springs is interposed between the levers of each of the lever pairs; the lever pairs and the links are preferably metal. The tube may be either plastic or wood, and a secondplastic pad substantially similar to the first plastic pad is disposed on each of the cross-members in the vicinity of the second ends, respectively.

BRIEF DESCRIPTION OF THE DRAWINGS

My invention will be better understood by means of the accompanying drawing in which.

DESCRIPTION OF THE PREFERRED EMBODIMENT

Figure 1:
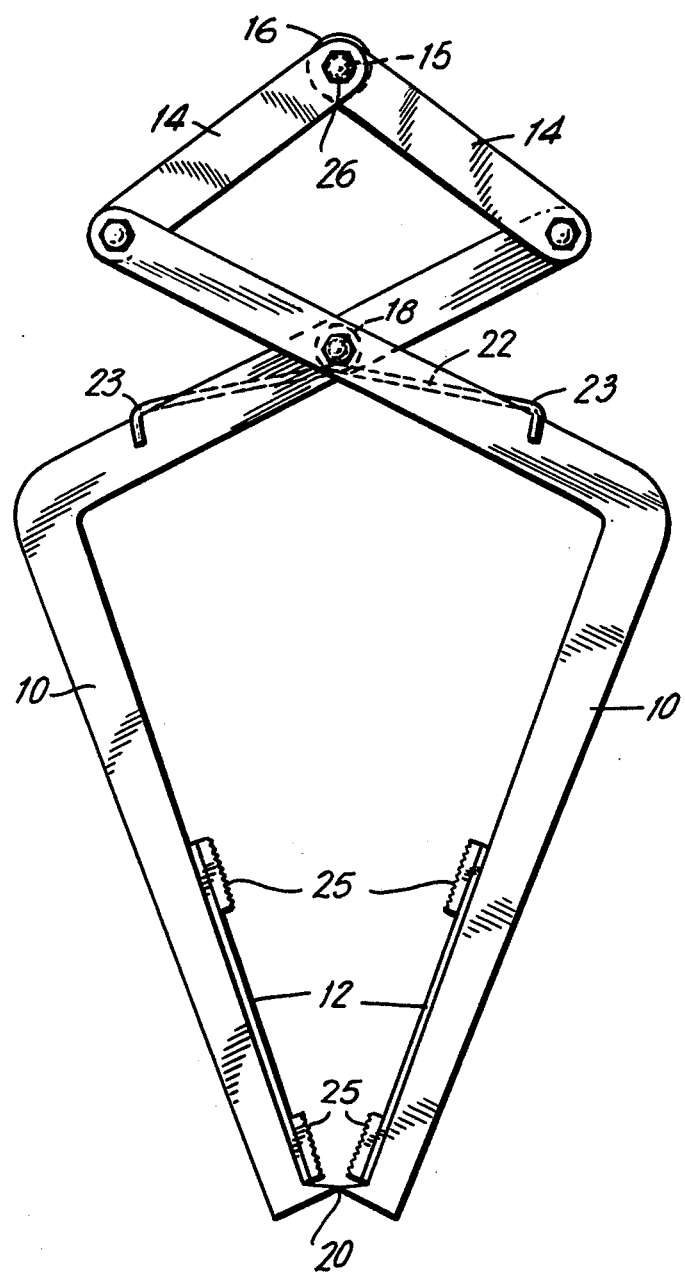
FIG. 1 shows a side view of the case or carton lifter according to my invention.
Figure 2:
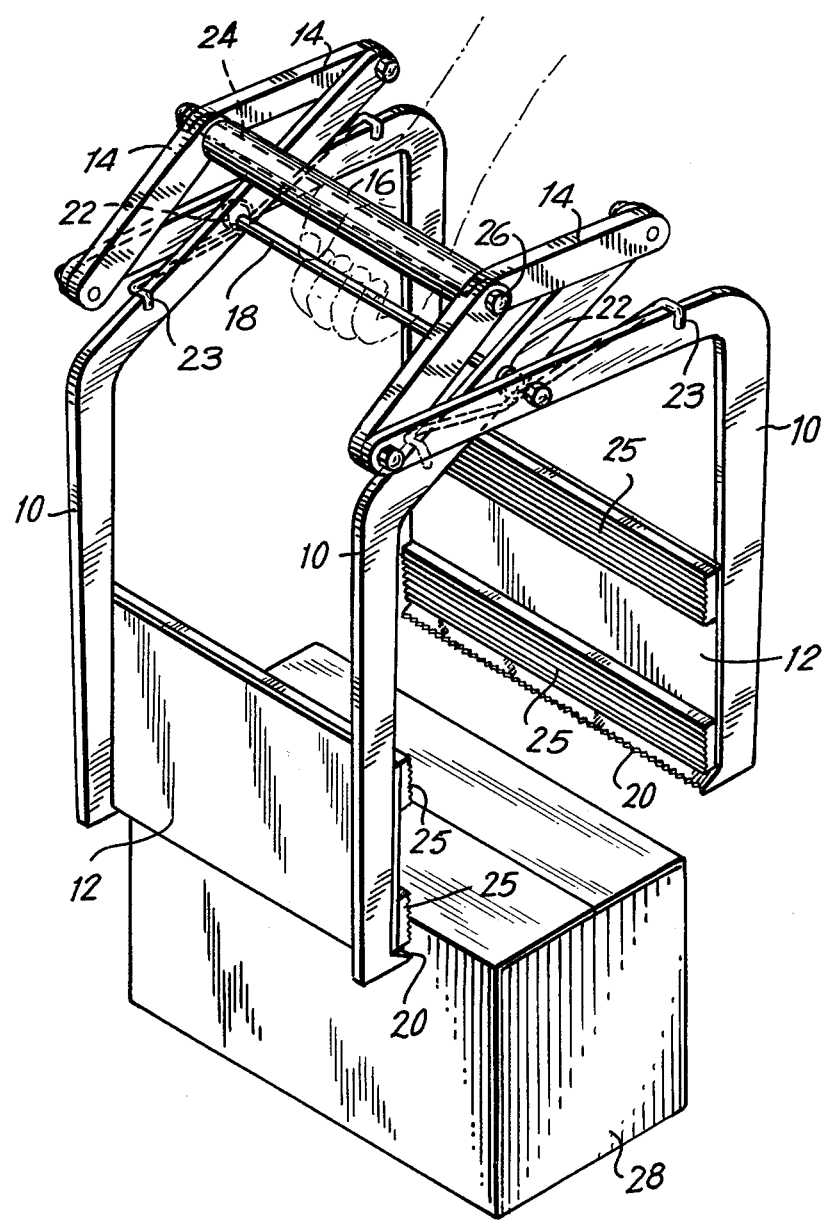
FIG. 2 shows a perspective view of the case or carton lifter of FIG. 1.
Figure 3:
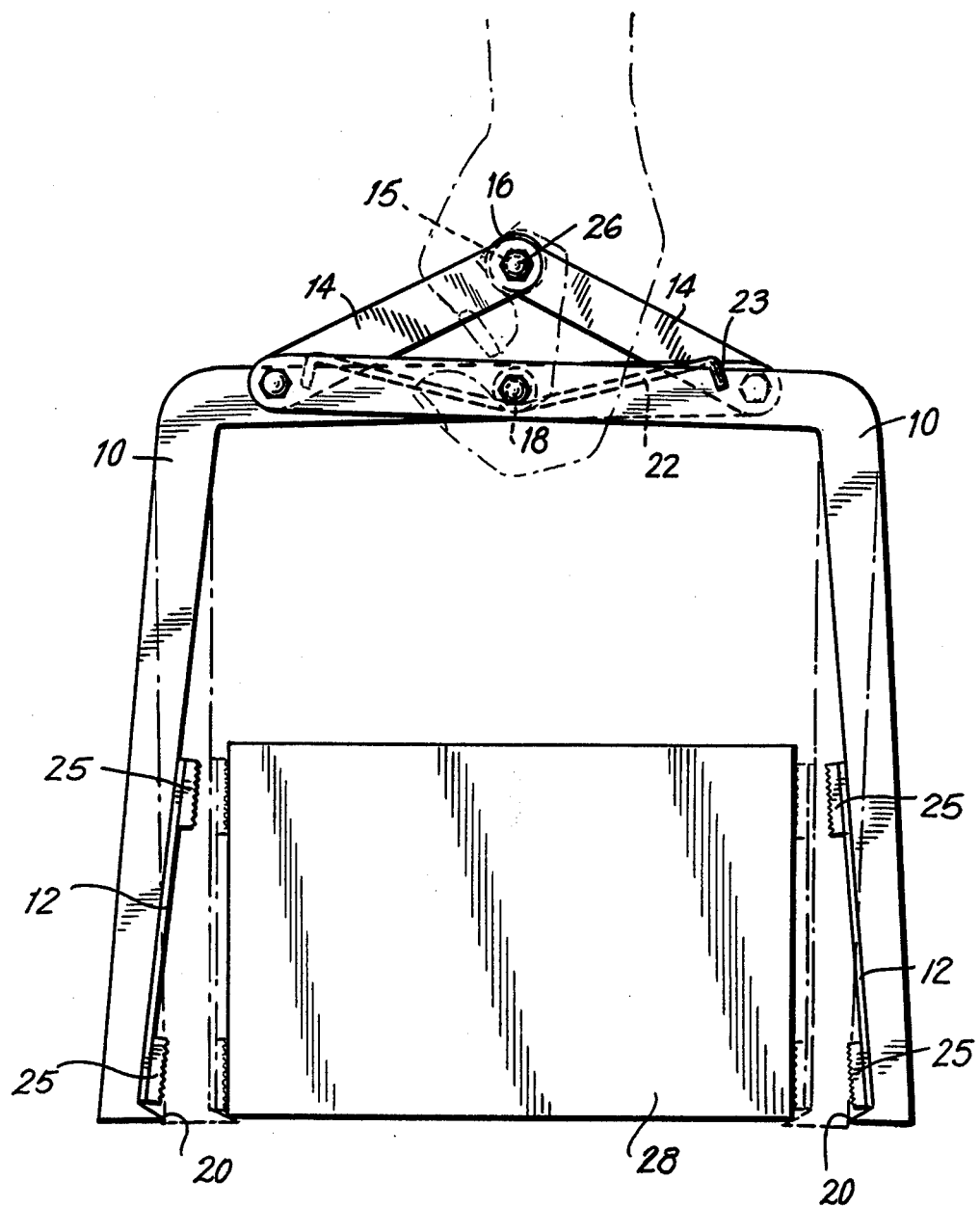
FIG. 3 shows a side view corresponding to FIG. 1 in the open position, the carton lifter being ready to grip a carton or case.

Referring now to the drawing, the tongs, according to my invention, include two laterally spaced pairs of substantially V-shaped jaw levers 10, preferably made of metal, which are pivotally connected intermediately of their first and second ends. Cross-members 12 rigidly connect the levers 10 at points below the lever pivotal connections for pivotal movement in unison from a collapsed position, best shown in FIG. 1, to an extended position, best shown in FIGS. 2 and 3. First and second links 14 pivotably connected to one another join the first ends of the levers 10 of each pair of levers for opening and closing the tongs. A handle 16, preferably a plastic or wooden tube having a bolt 24 passing therethrough, extends between the connecting links 14 at the link pivotal connection. Each of the links 14 is formed with an opening 15 for a bolt 24 to pass therethrough, and the bolt has threaded ends; nuts 26 may be threaded on the bolt ends, respectively, so as to connect the links 24 through openings formed therein to the handle 16 after the bolt 24 has been passed through the tube 16 and the link openings, and the nuts 26 have been screwed onto the bolt. A second handle 18 is substantially coextensive with the handle 16 and extends between, and connects the lever pivotal connections. The handle 18 has a shape similar to the bolt 24, and the levers 10 are attached to the bolt 18 at the lever pivotal connections in a manner similar to the links 14 being attached to the bolt 24. The levers 10 are pivotally attached to the links 14, respectively, by a conventional nut and bolt structure not further described in detail. Each of the cross-members 12 has an inner side, and gripping means 20 are provided on the inside of each of the cross-members 12 for gripping a carton, case or the like. The gripping means 20 include preferably a plurality of metal teeth disposed on each of the cross-members 12 in the vicinity of the second ends of the levers 10, and four plastic pads 25; each pad 25 has a serrated surface; pairs of the pads 25 are disposed on each of the cross-members 12 remote from, and in the vicinity of, the second ends of the levers 10, respectively, for gripping a case, such as a carton 28. Two torsion springs 22 interposed, respectively, between the levers of each lever pair, are provided which are wrapped around the handle 18 in such a fashion so that respective L-shaped ends 23 of the spring 22, are in gripping contact with the levers 10, respectively, for urging the jaw levers to occupy the collapsed position. The second ends of the levers 10 are then closest to one another. The handles 16 and 18 may be jointly gripped and pulled towards one another for the jaw levers 10 to occupy an extended position, so that the second ends of the levers 10 are furthest apart from one another, as best illustrated in FIGS. 2 and 3.

In the extended position the metal teeth and the plastic pads 25 can then grip the liquor carton, the springs 22 urging the metal teeth to grip the case 28 firmly, and the plastic pads 25 providing additionally a secondary gripping surface for the case, or carton.

It will be understood that my invention is not limited to the above embodiments shown, and variations may be made which are within the scope of the appended claims.

What is claimed is:

1. A tong apparatus employing two laterally spaced pairs of jaw levers having first and second ends, respectively whereby said levers are pivotally connected intermediately of said respective first and second lever ends, cross-members rigidly connecting the levers of said pairs at points below the lever-pivotal connections for pivotal movements in unison, first and second links pivotably connected to one another joining the first ends of the levers of each pair for opening and closing said apparatus, a first handle extending between the connected links at the link pivotal connection, a second handle substantially coextensive with said first handle and extending between, and connected to said lever-pivotal connections, said apparatus including: gripping means provided on an inner side of each of the cross-members, spring means wrappable around said second handle and having its ends in gripping contact with the jaw levers, respectively, of one of the lever pairs, for urging said jaw levers to occupy a first position causing said second jaw lever ends to be positioned closest to one another, each of said levers being substantially V-shaped and said gripping means being defined by a plurality of metal teeth disposed on each of said cross-members in the vicinity of said second ends of said levers, and a plastic pad having a serrated surface disposed on each of said cross-members remote from second ends of said levers, respectively, said first and second handes being jointly grippable and pullable towards one another for said jaw levers to occupy a second position causing said second lever ends to be positioned furthest apart from one another, the gripping means being adapted to grip an article interposed between said jaw levers in said second position upon said first and second handles being released from the joint grip.

2. A tong apparatus according to claim 1, further comprising: a second plastic pad substantially similar to the first plastic pad being disposed on each of said cross-members in the vicinity of said second ends of said levers, respectively.

* * * * *